United States Patent
Townsend

[19]
[11] Patent Number: 5,953,421
[45] Date of Patent: Sep. 14, 1999

[54] QUANTUM CRYPTOGRAPHY

[75] Inventor: Paul David Townsend, Suffolk, United Kingdom

[73] Assignee: British Telecommunications public limited company, London, United Kingdom

[21] Appl. No.: 08/776,296
[22] PCT Filed: Aug. 16, 1995
[86] PCT No.: PCT/GB95/01940
§ 371 Date: Jan. 30, 1997
§ 102(e) Date: Jan. 30, 1997
[87] PCT Pub. No.: WO96/06491
PCT Pub. Date: Feb. 29, 1996

[51] Int. Cl.⁶ .................................................. H04L 9/00
[52] U.S. Cl. .................... 380/21; 380/9; 380/49
[58] Field of Search .................... 380/21, 9, 59, 380/49; 359/112

[56] References Cited

U.S. PATENT DOCUMENTS

| | | |
|---|---|---|
| 4,965,856 | 10/1990 | Swanic . |
| 5,191,614 | 3/1993 | LeCong . |
| 5,243,649 | 9/1993 | Franson . |
| 5,307,410 | 4/1994 | Bennett . |
| 5,311,592 | 5/1994 | Udd . |
| 5,339,182 | 8/1994 | Kimble et al. . |
| 5,418,905 | 5/1995 | Rarity et al. . |
| 5,515,438 | 5/1996 | Bennett et al. . |
| 5,675,648 | 10/1997 | Townsend . |
| 5,757,912 | 5/1998 | Blow ........................................ 380/21 |
| 5,764,765 | 6/1998 | Phoenix et al. ........................ 380/21 |

OTHER PUBLICATIONS

Townsend et al, "Single Photon Interference in 10km Long Optical Fibre Interferometer", Electronics Letters, 29 (1993) Apr. 1, No. 7, Stevenage, Herts., GB.

Muller et al, "Experimental Demonstration of Quantum Cryptography Using Polarized Photons in Optical Fibre Over More than 1km", Europhysics Letters, 23 (6), pp. 383–388 (1993).

Primary Examiner—David Cain
Attorney, Agent, or Firm—Nixon & Vanderhye P.C.

[57] ABSTRACT

In a method of communication using quantum cryptography, single-photon signals from a highly attenuated source are modulated and subsequently detected. In the step of detecting the modulated signal, the signal is split between two branches according to its encoded state. Signals corresponding to different encoded states are detected independently in the respective branches and the rate of detection of coincident signals is determined. This rate is compared with a threshold to detect the presence of an eavesdropper.

10 Claims, 8 Drawing Sheets

QUANTUM CRYPTOGRAPHY

BACKGROUND TO THE INVENTION

The present invention relates to a communications system using quantum cryptography.

As described in the present applicant's earlier applications Nos. PCT/GB93/02637 and PCT/GB93/02075, quantum cryptography is a technique for the distribution of a key for use in the subsequent encryption or decryption of transmissions in a communications system. The key is distributed by modulation of a single-photon signal. Any eavesdropper intercepting the single-photon signal disturbs the statistics of the received data, and so can be detected. The term "single-photon signal" encompasses any signal having the required quantum properties. It may be a true single-photon generated, for example, by parametric down-conversion. Such a technique is described and claimed in our earlier above-cited applications. Such true single-photon sources have been found however to be difficult to construct and run reliably. In general therefore it is preferable to take a "classical" source, such as a laser diode (LED) and to attenuate severely the output from such a source to a level such that in a given time slot there is in general no more than one, and on average very much less than one photon.

SUMMARY OF THE INVENTION

According to a first aspect of the present invention, there is provided a method of communication using quantum cryptography including the steps of modulating a single-photon signal from a highly attenuated source, and detecting the modulated signal, characterised in that in the step of detecting the modulated signal the signal is split between two branches according to its encoded state, and signals corresponding to different encoded states are detected independently, and in that the rate of detection of coincident signals in the two branches of the detector is determined and compared with a threshold to detect the presence of an eavesdropper.

The present invention uses properties specific to signals from an attenuated source, and the eavesdropping techniques necessary to attack a signal from such a source, to provide a new approach to the detection of any eavesdropper. This enables the method of the present invention to provide enhanced security for the quantum cryptographic techniques previously proposed by the present applicants and others, and can also make possible the use of certain simplified encoding techniques for the quantum signal which, without the approach of the present invention, would not offer adequate security.

When a highly attenuated source is used, the attenuation is set at levels sufficient to make it highly unlikely that more than one photon would be present in any given time slot. To achieve this the average number of photons per time slot has to be considerably less than one. For example, the average level $\bar{n}$ may be 0.1.

An eavesdropper attempting to intercept the encoded key data might use a beam splitter to split off a fraction of the photon power while leaving the remainder to be transmitted on to the receiver. This however would in general lead to a marked reduction in the detection rate at the receiver unless the splitting ratio was very small, in which case the amount of useful data which the eavesdropper could extract would be very limited. In practice all real channels suffer from finite loss and this opens the possibility of a beamsplitting attack in which the eavesdropper compensates for her beam-splitting loss by substituting a lower loss channel. However, optical fibres already achieve the theoretical minimum loss, making it technically very difficult to substitute a channel of lesser loss, especially for channels of km lengths or greater. The eavesdropper might alternatively use an intercept/resend attack. As the name suggests, this involves the eavesdropper detecting destructively incoming signals and then re-sending an appropriate modulated signal for detection at the receiver. However, when the original intensity level is significantly less than 1, then retransmitting photon signals at that same intensity level in response to every detection at the eavesdropper causes a dramatic reduction in the count rate at the receiver. This can be understood in terms of the eavesdropper replacing a detected single photon by a signal which will result in the detection of a photon at the receiver on only one occasion in ten, in the case of an intensity level of 0.1. The statistics of this process are described fully and treated more rigorously in the theoretical discussion below.

To avoid this reduction in the count rate at the receiver, the eavesdropper might increase the intensity of the single photon signals it transmits on. On the basis of the simple reasoning used above, one would expect that by increasing the average intensity to be equal to 1, the variation in count rate at the receiver should be eliminated. While in practice, for receivers of finite efficiency, this is the case, the generation by the eavesdropper of signals of increased intensity can be detected according to the present invention as a result of a corresponding increase in coincidence counts at a beam splitter at the detector.

The step of detecting the rate of coincidence may include detecting coincident signals in real time using a coincidence gate connected to a pair of single-photon detectors. Preferably however the step is carried out after the detection of the single-photons by processing of data recorded for different time slots. In this case preferably the signals from different branches are recorded at different respective detectors, but alternatively a single detector might be used, with the signals from the different branches separated in the time domain by a delay introduced in one of the branches.

The step of splitting the modulated signal between two branches and detecting the rate of coincidence signals may be carried out for those single-photon signals determined to have been modulated and detected using different bases.

It can be shown that where different modulation and detection bases are used in a four-state encryption protocol as described below, that this is formally equivalent to measurements carried out with a beam splitter. The signals may therefore be used for coincidence detection.

Alternatively, the single-photon signal may be modulated using a basis comprising two non-orthogonal states, and the step of detecting the rate of coincidence may be carried out in relation to signals determined at the receiver to have been encoded with a known state at the transmitter.

As further described below, the present invention can be used to enhance significantly quantum cryptography using two non-orthogonal states. Such a two-state scheme, as proposed hitherto, has required the use of a multi-photon reference pulse transmitted within a very short time of the single-photon pulse. However detecting a second pulse on a short time scale present serious practical problems because of the dead time of typically 1 $\mu$S associated with appropriate photon detectors. The present invention, through the use of coincidence detection, is able to make the two-state scheme secure without requiring the transmission and detection of reference pulses.

The present invention is not limited to use with point-to-point links, but may also be used with a variety of network topologies including, branched or star topologies, and looped-back or ring topologies as described in further detail below and described and claimed in our co-pending International Applications Nos. PCT/GB 94/01953 and PCT/GB 94/01952.

Using current technologies, quantum cryptography has been implemented successfully over optical fibre links as long as 30 km [C. Marand and P. D. Townsend, Optics Letters, vol.20 Aug. 15, 1995] and so is suitable for a wide range of industrial applications including LANs, campus-wide networks and MANs (Metropolitan Area Networks). It may also be used for secure links, for example, between two core servers in a larger optical telecommunications network.

According to a second aspect of the present invention there is provided a communications system for use in a method of quantum cryptography comprising a transmitter (T) including a highly-attenuated optical source, one or more receivers (R1–R3) and a network linking the transmitter to the or each receiver, characterised in that the receiver includes means for determining the rate of detection of coincident signals in branches of the receiver corresponding to different encoded states and compares the rate of detection with a threshold to detect the presence of an eavesdropper.

BRIEF DESCRIPTION OF THE DRAWINGS

Systems embodying the present invention will now be described in further detail, by way of example only, with reference to the accompanying drawings in which.

DESCRIPTION OF EXAMPLES

Figure 1:
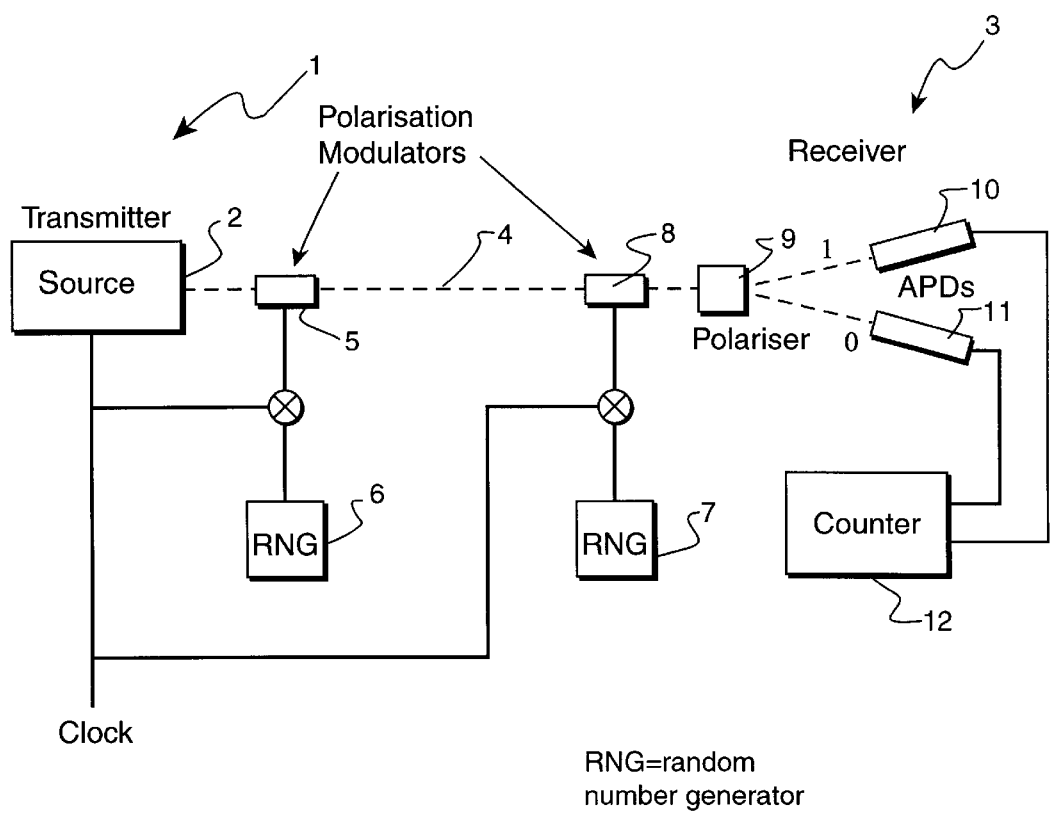
FIG. 1 is a schematic of a point-to-point system embodying the present invention.

An optical communications system 1 configured for the distribution of a key using quantum cryptography comprises a transmitter 2 and a receiver 3 connected by a transmission medium 4 which may be, for example, an optical fibre link. A polarisation modulator 5 in the transmitter 2 randomly encodes outgoing single-photon signals in response to a data stream from a random number generator 6. A further random number generator 7 in the receiver similarly controls a respective polarisation modulator 8. The output from the receiver polarisation modulator passes to a polariser which directs the optical signal to one or other of two single-photon detectors 10,11 depending on their polarisation state. The outputs of the single-photon detectors 11,10 are monitored by a coincidence counter 12.

Figure 7:
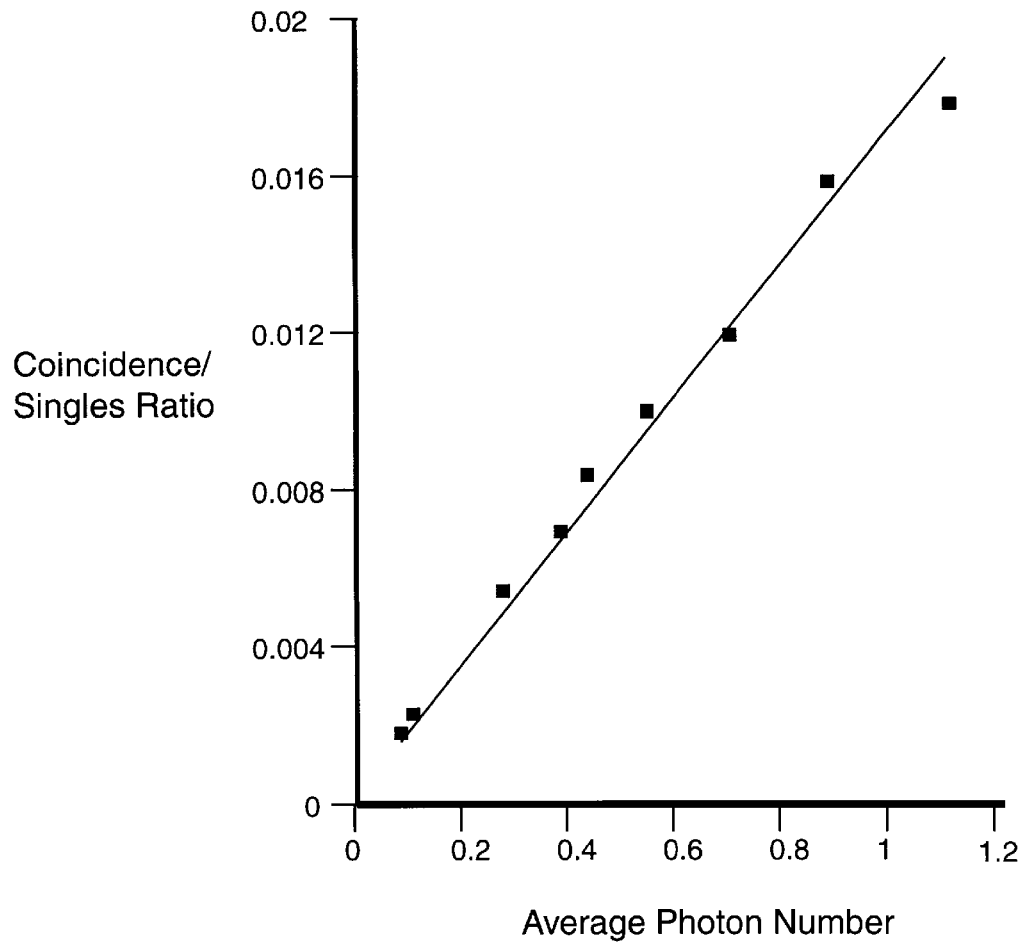
FIG. 7 is a plot of experimental data showing coincidence detection as a function of average photon number.

The single-photon source 2 is an attenuated classical source which may be coherent or incoherent. As described in further detail below, the statistics of signals produced by such a source are exploited to facilitate the detection of any eavesdropper intercepting the modulated signals transmitted on the medium 4. In particular, a rise in the coincidence detection rate is detected when an intercept/resend attack occurs. FIG. 7 shows an experimental demonstration of this effect in the context of a system such as that shown in FIG. 1. The experiment is used to represent the communication link between the eavesdropper (transmitter) and the receiver i.e. the resend part of the attack. The scheme is simplified by replacing the random number generators and modulators by a static polarisation controller set so that the polarisation state of the photons arriving at the transmitter is constant, with either circular (right or left) or diagonal linear (+45° or −45°) states selected. The polariser in the receiver is oriented such that vertical (0°) linear states are routed to detector 1 and horizontal (90°) linear states routed to detector 2. In this case the experiment continuously simulates the portion of the quantum key transmission for which the eavesdropper has chosen a different basis to the receiver and hence there is a finite probability of a coincidence count. FIG. 7 shows how the ratio of the number of coincidence events (count in detector 1 and detector 2) to the number of singles events (count in detector 1 only) changes as the eavesdropper increases the average number of photons n in the resent pulses. The ratio is of the order of $2\times10^{-3}$ for n=0.1 and rises to $2\times10^{-2}$ for n=1. The straight line is a plot of equation 8 below with values of $\eta=3.5\times10^{-2}$ and T=1. The latter represent the experimentally measured values of the detection efficiency of the germanium APDs and the transmission coefficient of the optical fibre channel respectively. As already discussed, even if the channel between the legitimate transmitter and the eavesdropper is lossless and the eavesdropper has perfectly efficient detectors ($\eta=1$) the count rate at the receiver will be very low if e.g. both the eavesdropper and the transmitter use n=0.1 pulses. Consequently, the eavesdropper is forced to resend pulses with n≈1 in order to keep the singles count rate approximately constant. The experimental data in FIG. 7 shows that in this case there is a dramatic increase in coincidence count rate that reveals the presence of the eavesdropper.

Figure 4:
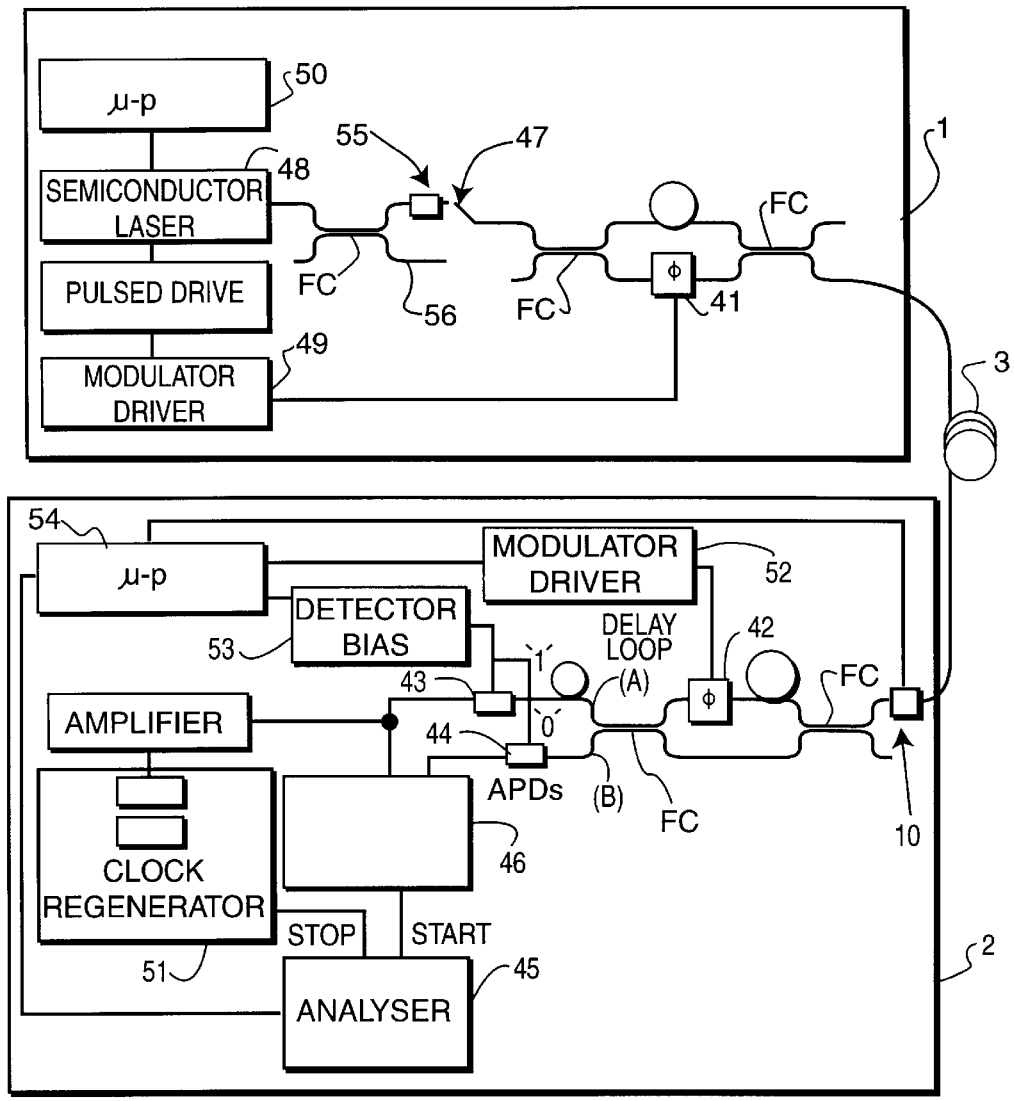
FIG. 4 is a detailed schematic of a system embodying the invention.

FIG. 4 shows in further detail a system embodying the present invention. The transmitter 1 includes a pulsed semiconductor laser which may be, e.g., a DFB laser. One example of an appropriate device is an Hitachi series HL1361 DFB laser diode operating at 5 mW optical power at 1290–1330 nm. In the present example, this scheme is implemented in an optical fibre-based form (FIG. 4), in which both the quantum channel and the public channel are transmitted on a transmission fibre 3 linking the transmitter 1 to the receiver. In the transmitter a pulsed semiconductor laser 48 provides the optical source. The laser 48 and a modulator driver 49 for a phase modulator 41 are controlled by a microprocessor 50. The receiver 2 has its own local control microprocessor 54 which controls a respective phase modulator 42 via a modulator driver 52. The receiver control processor also controls a detector bias supply 53 for two detectors 43,44. In both the transmitter and the receiver, where the signal path branches fused-fibre 50/50 couplers are used. Suitable couplers are available commercially from SIFAM as model P2S 13AA50.

Figure 8:
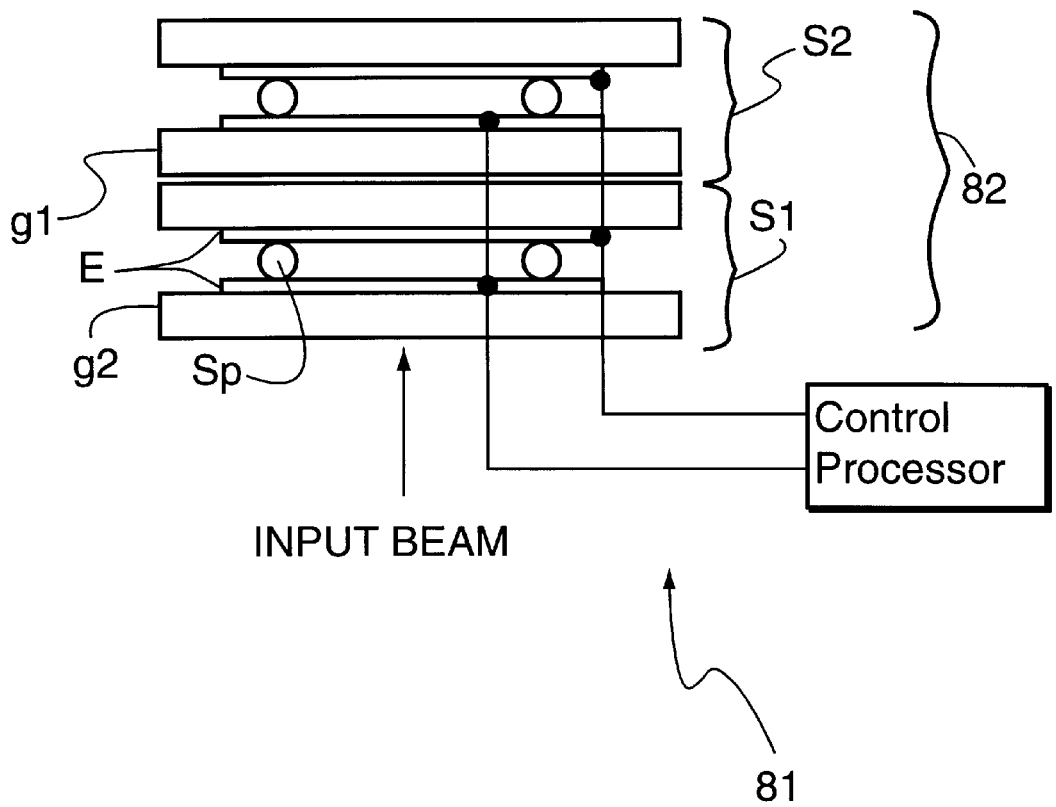
FIG. 8 is a schematic of a liquid crystal polarisation modulator.

Appropriate modulators 41,42 for the data encoding and decoding are lithium niobate or semiconductor phase modulators operating at e.g. 100 MHz. Alternatively, liquid crystal polarisation modulators may be used. FIG. 8 shows a polarisation modulator 81 comprising a stack 82 of liquid crystal cells. In the example of FIG. 8, the stack comprises two chiral smectic-C cells S1, S2. Each cell comprises a pair of glass substrates g1, g2 with an InTiO electrode E formed on each substrate. A polyimide coating, rubbed in one direction is formed on each of the electrodes. The rubbing directions on top and bottom substrates are usually opposed to minimise the stored splay elastic energy arising from the slight surface pretilt of the liquid crystal molecules. Although polyimide alignment layers are preferred, other planar alignment materials are possible e.g. rubbed nylon, rubbed polyvinyl alcohol, or obliquely evaporated silicon oxide or magnesium fluoride. On balance polyimides have so far tended to give the best all round performance. As an alternative to the structure of FIG. 8, a single double-sided substrate may replace the upper substrate of S1 and the lower substrate of S2. spacers SP separate the substrates and define a volume in which the liquid crystal material is confined. Spacer material may be located at the periphery or scattered, possibly randomly throughout the cell. An adhesive seal may be applied to one of the substrates to define the lateral boundary of the cell. The seal will have one or more gaps to permit capillary filling (under vacuum if only one gap is used) with liquid crystal. There is a wide range of ferroelectric liquid crystal (FELC) and liquid crystal mixtures available commercially that may be used in such devices, for example a suitable material is that available from Merck as ZLI-4318. A complete listing of available ferroelectric mixtures is available from Merck Ltd. at Merck House, Poole, Dorset, BH15 1TD, UK.

The spacing between the glass substrates in each cell is typically in the range 1.5 to 2 $\mu$m. The thickness of each cell and refractive index anisotropy of the liquid crystal is chosen so that at the wavelength of the input beam the cell functions e.g. as a half-wave or quarter-wave plate. In the present example, the liquid crystal material is assumed to have a typical birefringence of 0.15. Therefore, for operation at a wavelength of 830 mn, for operation as a half-wave plate the cell is arranged to have a thickness of 2.8 $\mu$m, while a quarter-wave plate uses a cell of half that thickness.

If the liquid crystal material has a different birefringence, then the cell thickness is scaled accordingly. Selected FELC materials may have birefringences as high as 0.5. However, more typically, FELCs have birefringences in the range 0.15–0.13 at 589 nm. When a field is applied across each cell using the electrodes, the liquid crystal molecules in the cell tilt at a characteristic tilt angle $\theta$. Changing the polarity of the applied field flips the molecules through an angle of $2\theta$. The cell functions as a bistable device which is switched by the field between these two stable orientation states and can not in general have any stable intermediate orientations. Ferro-electric chiral smectic C materials possess a strong spontaneous polarisation at an angle approaching 90° to the longitudinal direction of the molecule. It is this spontaneous polarisation that interacts with the electric field. The surface stabilisation and the chirality of the material ensures that when the spontaneous polarisation reverses during switching, then the layer tilt flips from $+\theta$ to $-\theta$ in the plane orthogonal to the applied electric field. The magnitude of the layer tilt is not altered by the field, but only its rotation sense. It should be understood that there is no tendency for the longitudinal axis of the molecules to line up with the electric field, i.e. for them to tilt relative to the cell walls. The layer tilt is always induced in the plane along the field direction. Bistable FE switching can be observed at voltages typically up to +/− 50 V $\mu$m$^{-1}$ or more before they break down.

Appropriate single photon detectors would be, for example, semiconductor avalanche photodiodes such as those described in B. F. Levine, C. G. Bethea and J. C. Campbell, Electronics Letters, 20 596 (1984). These are biased beyond reverse breakdown and operate in the Geiger mode with passive or active quenching, as discussed in R G W Brown, K D Ridley and J G Rarity; Appl. Opt. 25 4122 (1986) and Appl. Opt. 26, 2383 (1987). The key distribution protocol requires each received photon to be associated with a given clock period and also identified as a 0 or 1 depending upon which APD it is detected at. These functions are performed by a time interval analyser 45 (e.g. Hewlett-Packard 53310A). The start signals for this device are provided by the APD outputs after processing by a circuit 46 comprising amplifiers and discriminators connected in series with each output and an OR gate connected to the discriminators (e.g. Lecroy 612A, 821 and 622). The stop signals are provided by the clock regenerator which is described below. The detection procedure is described in P. D. Townsend, J. G. Rarity and P. R. Tapster, Electronic Letters, 29,634 (1993) and 29, 1291 (1993). Silicon APDs such as the SPCM-100-PQ (GE Canada Electro Optics) can be used in the 400–1060 nm wavelength range, while germanium or InGaAs devices such as the NDL5102P or NDL5500P (NEC) can be used in the 1000–1550 nm range.

As noted above, ideally the quantum channel uses pulses containing at most one photon. This situation is approximated by connecting an attenuator 55 in line with the laser source in order to reduce the intensity to a level such that the average number of photons per pulse, n, is about 0.1.

As seen in FIG. 4, an alternative mechanically switched path 56 is provided for the output from the laser, which bypasses the attenuator or single-photon source. The switch may be, e.g., JDS-Fitel SW12. This provides the public channel at the same wavelength as the quantum channel but using bright multi-photon pulses. The large intensity of these pulses would lead to saturation and current heating effects in the single-photon detectors. In order to avoid this happening, the reverse bias on the APDs is reduced well below breakdown so that the devices operate with greatly reduced sensitivity in the standard analogue mode. Alternatively the APDs may be isolated by means of electromechanical optical switches, similar to that used in the transmitter, or using electro-optic switches, which route the multi-photon pulses to an additional standard detector such as a p-i-n photodiode. Alternatively, the public channel may be encoded on a different wavelength propagating though the same fibre transmission link. In this case, the public channel is routed to a standard detector using wavelength-sensitive couplers. Additional isolation at the quantum channel wavelength may be provided by means of wavelength-selective filters.

Since this channel operates with many photons per pulse, it is classical in nature and is therefore open to attack by any eavesdropper. This channel provides the public channel for the encoding protocol. The transmitter and receiver communicate on this public channel to exchange information on which encoding/decoding alphabets were used for given signal pulses. On the basis of this data, the statistics of the signal received at the receiver can be analysed to determine whether the key has been received securely, or whether an eavesdropper has intercepted any part of the key.

In addition to use for this public discussion stage of the protocol, the public channel is also used to calibrate the transmission system. Over a long optical fibre link, which may be as long as say 50 km, unavoidable environmental effects on the fibre, such as temperature fluctuations, cause both the polarization and phase of the transmitted pulses to vary slowly and randomly with time. The calibration step makes it possible to correct for these variations, as described in our above-cited International application PCT/GB93/02637.

Figure 6:
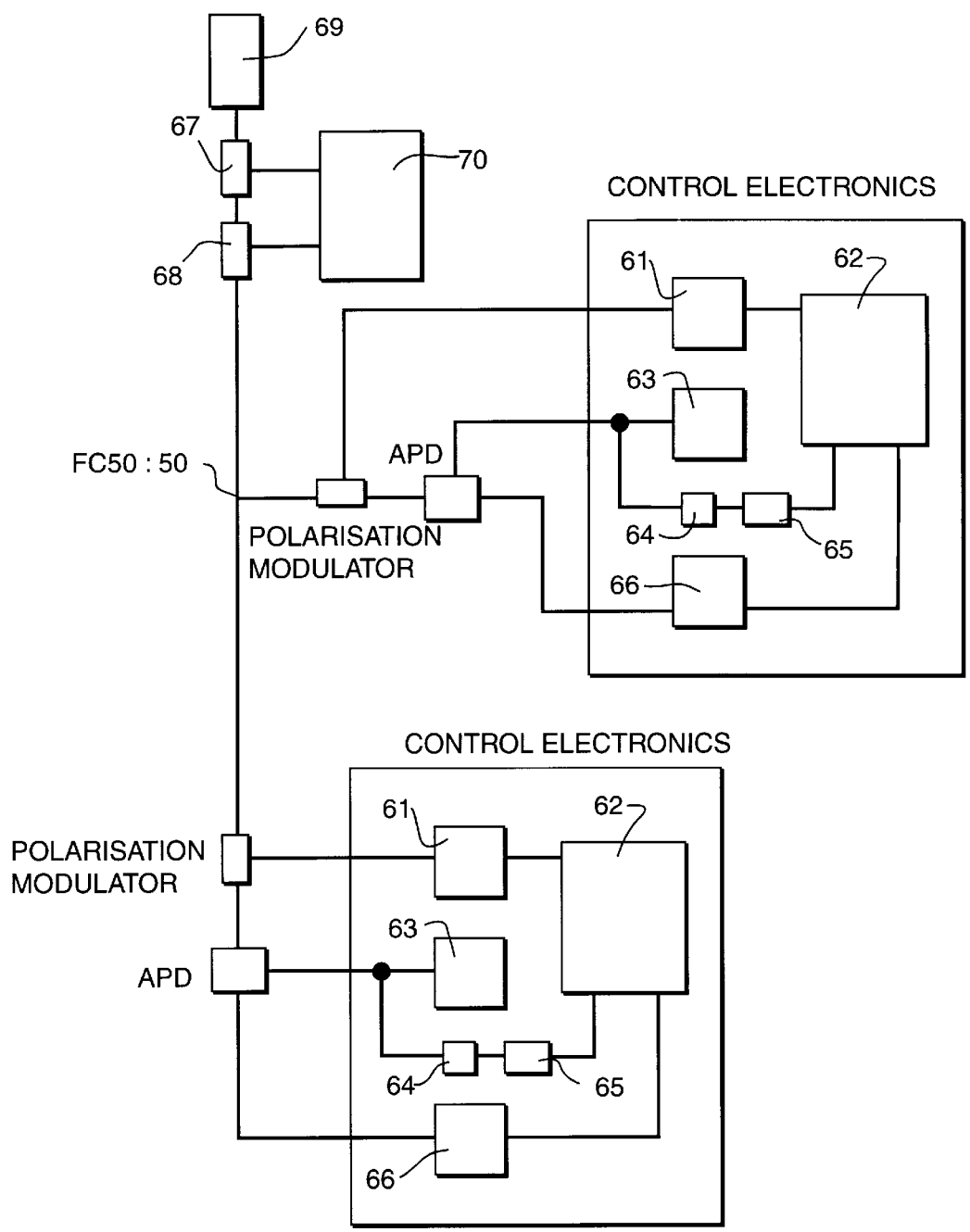
FIG. 6 shows a further alternative multiple access topology.

FIG. 6 shows a multiple access network for use with the present invention. Although in the example of FIG. 6, only two receivers are shown, in practice networks employing greater numbers of receivers will often be used. The number chosen will vary according to the field of use. For a local installation on a single site, the network might comprise only ten receivers or terminals. By contrast, for a public network several tens or even a hundred or more receivers might be connected to the network and would receive quantum keys distributed from a single-server. Any one of a number of different configurations can be used for the network, including, for example, tree, bus, ring or star configured networks, or combinations thereof.

FIG. 6 shows a specific example of a broadcast network containing two receivers and a transmitter. The transmitter consists of a gain-switched semiconductor laser 9, of the type described above, an attenuator or intensity modulator 67, and a polarisation modulator 68 and control electronics 70. The single-photon detectors in the receivers may be the same devices as described in the first embodiment discussed above. Each receiver includes a microprocessor control unit 62, which receives the output of the APD via a discriminator/amplifier circuit 63. The control unit 62 also controls an electronic filter 64 and local oscillator 65, as well as the APD bias supply 66. The electronic filter 64 isolates the first harmonic of the frequency spectrum of the signal output by the APD in response to synchronising pulses received via the network. This generates a sinusoidal signal at the pulse frequency which locks the local oscillator 65. The output of the local oscillator 65 is received at the control unit 62 to provide a timing reference during quantum transmissions.

Figure 5:
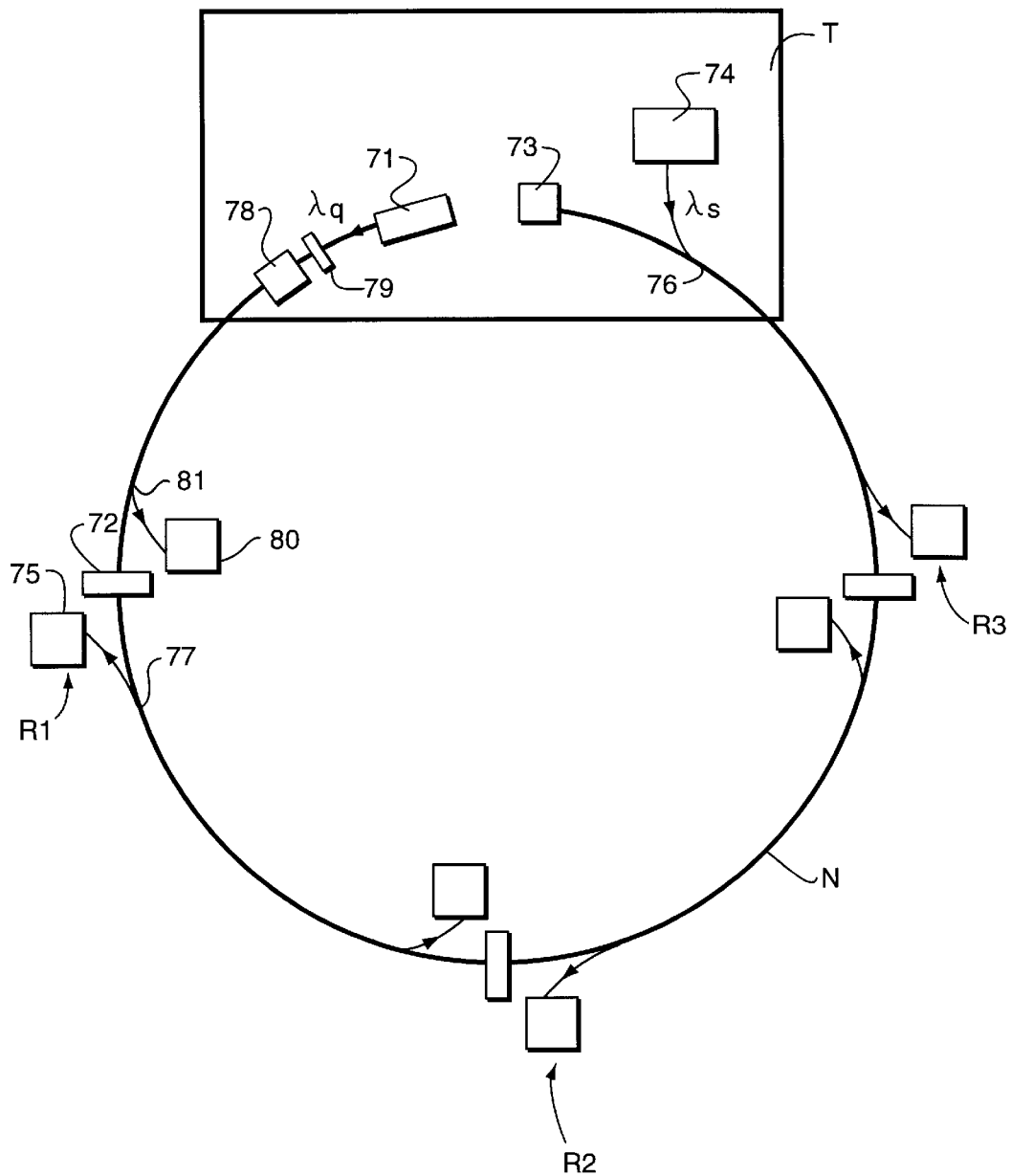
FIG. 5 shows an alternative embodiment using a multiple access ring topology.

FIG. 5 shows a further alternative embodiment using a ring topology. The system comprises a transmitter/exchange T connected to three receivers R1–R3 via a passive optical network N having a ring topology. The transmitter T includes both a quantum channel source 71 for use in establishing a key by quantum cryptography, and also a conventional intensity-modulated source for outputting multi-photon signals for the calibration phase and also for carrying conventional traffic. The quantum channel source 71 and standard source 74 operate at different wavelengths $\lambda_q$ and $\lambda_s$ respectively. The output from the quantum source 1 passes through a switchable attenuator 79 and a polariser and band-pass filter 78 tuned to the quantum channel wavelength $\lambda_q$.

Each receiver or node comprises a first multi-photon detector 75 for the signal on channel $\lambda_s$, a detector 80 for multi-photon timing signals at the quantum channel wavelength $\lambda_q$, and a modulator 72, which in the present example is a polarisation modulator. The clock detector 80 is connected to the network N by a fibre coupler 81 which provides a weak tap at $\lambda_q$. These taps have low coupling fractions (e.g. of the order 1%) in order not to introduce excessive attenuation in the quantum channels. Alternatively if a separate wavelength $\lambda_c$ is used for the calibration signals then WDM couplers which have a finite coupling fraction at $\lambda_c$ and ideally a zero-coupling fraction at $\lambda_q$ can be employed. The detector 75 for the signal wavelength is connected to the network by a WDM (wavelength division multiplexer) coupler 77. The WDM is a fibre coupler with a wavelength-dependent coupling characteristic. In the present example the WDM provides a straight-through route for the quantum channel, i.e. the coupling fraction out of the loop is small at $\lambda_q$, whilst at the signal wavelength $\lambda_s$ the coupling fraction has a much larger value $F_s$.

Attenuated coherent or incoherent sources of the type used in the present invention typically produce superpositions or statistical mixtures respectively of n-photon states which obey Poissonian statistics (although this is not crucial for the operation of the quantum cryptography scheme). Consequently, the probability that the source generates an optical pulse containing n-photons is given by $$P_n = \frac{\bar{n}^n e^{-\bar{n}}}{n!} \quad (1)$$

A typical receiver, of the type illustrated in FIG. 1, contains a detector such as an avalanche-photodiode (APD) that is reverse-biased beyond breakdown in order to achieve sensitivity at the single photon level. The probability that an incoming optical pulse generates n photo-electrons in such an APD is given by $$P_n = \frac{(\bar{n}\eta T)^n e^{-\bar{n}\eta T}}{n!} \quad (2)$$

where $\eta$ is the quantum efficiency of the APD, and T is the transmission fraction or coefficient of the quantum channel. As discussed in P. D. Townsend and I. Thompson, Journal of Modern Optics Vol 41 p.2425 1994, the optical pulse duration is generally chosen to be much shorter than the APD dead-time. Hence, the APD can generate at most one voltage pulse per optical pulse, and the probability that this occurs is given by $$P_{(n \geq 1)} = 1 - P_{(n=0)} = 1 - e^{-\bar{n}\eta T} \quad (3)$$

Consequently the receiver's count rate will be $$R_r = R_t(1 - e^{-\bar{n}\eta T}) \quad (4)$$

where $R_t$ is the rate at which the attenuated source in the transmitter is pulsed i.e. the time-slot frequency. We see from equation 4, that when $\bar{n} \ll 1$ and $\eta = T = 1$ then $$R_r \approx \bar{n} R_t \quad (5)$$

so that the receiver's count rate is always less than the time-slot rate even in an ideal system. In order to explain the operation of the new detection scheme, we now consider a generalised receiver in which the output of the quantum channel is split between two branches, each of which is monitored by a single photon detector. Such a split could be achieved by means of a fibre coupler for example, however, we show later that the receiver illustrated in FIG. 1 also performs this function. Taking the example of a fibre coupler with a splitting ratio $\beta:(1-\beta)$, and following the procedure outlined above it can be seen that the count rate for the $\beta$ arm detector is $$R_\beta = R_t(1 - e^{-\bar{n}\beta\eta T}) \quad (6)$$

A similar expression with $\beta$ replaced by $(1-\beta)$ is obtained for the count rate for the other detector. If the two detectors are connected by an appropriate coincidence detection circuit, the coincidence count rate will be $$R_c = R_t(1 - e^{-\bar{n}\beta\eta T})(1 - e^{-\bar{n}(1-\beta)\eta T}) \quad (7)$$

In the specific case of $\beta = 0.5$, the coincidence rate can be conveniently normalised by the singles rate (equal for both arms) to give the ratio $$C = (1 - e^{-(\bar{n}\eta T/2)}) \quad (8)$$

which is essentially the probability for an incoming pulse to be split into two. In the case of $\bar{n}=0.1$, this probability is small i.e. C=0.05, showing that the attenuated pulses behave on the whole like indivisible particles. For true single photons the coincidence rate is zero, since splitting never occurs.

We now consider an eavesdropper on the quantum channel, and the two types of measurement strategy that could be employed. In the first strategy, the eavesdropper performs a "beamsplitter attack" in which an attempt is made to split the attenuated optical pulses. In this way a measurement could be performed on one half of the pulse, whilst the other half is left to propagate on to the receiver who would then be unaware of the eavesdropper's presence. However, as shown above, the attenuated coherent pulses are difficult to split in this way and only a small fraction of the pulses, and hence the key bits that they carry, will be leaked to the eavesdropper. Nevertheless, as discussed in Bennett et al. J. Crypt. 1992 it is important to take this fraction into account when calculating the total information leaked to the eavesdropper during the error correction and privacy amplification stages of the quantum cryptography protocol. Another important consideration is that the eavesdropper's beam splitter attack inevitably leads to a reduction in the receiver's count rate. For example, if the split-off power fraction is $(1-\beta)$ then the received count rate is given by equation 6, and comparison with equation 4 shows that the rate is reduced by the fraction $\beta$ appearing in the exponent. Evidently, if $(1-\beta)$ is large the receiver will experience a large reduction in count rate and will be alerted to the eavesdropper's presence. A sensible strategy for the eavesdropper would then be to reduce the count rate at the receiver by no more than the expected power fluctuations from the transmission source. If, for example, such temporal power fluctuations could be maintained at e.g. $\leq \pm 10\%$, a value which is readily achievable in practise, then the eavesdropper should use $(1-\beta) \leq 0.1$ in order to avoid setting off the alarm. However, in calculations of information leakage to the eavesdropper a much more conservative estimate of $(1-\beta)=1$ is usually taken (Bennett et al, J. Crypt 1992). This takes into account the possibility of compensating for a beamsplitting attack by the insertion of a lossless or lower loss channel. As discussed above, this type of attack presents severe technical difficulties, but it nevertheless represents an absolute worst case and therefore allows a very safe estimate of the secrecy of the key to be obtained. In considerations of the second type of eavesdropper attack, called "intercept/resend", the receiver's ability to monitor changes in the count rate is all-important and, as will be discussed, underpins the current invention in a fundamental way.

In intercept/resend the eavesdropper breaks into the channel and attempts to measure, and then send on copies of, the key data. Of course the quantum cryptography protocol is designed to detect the errors in the key that the eavesdropper's measurements unavoidably generate. However, the current invention achieves significant improvements in this detection probability by exploiting properties of the attenuated coherent states used in practical systems. In particular, by analogy with equation 4 we see that the eavesdropper's count rate will be $$R_e = R_t(1-e^{-\bar{n}_m \eta_e}) \quad (9)$$

where we have introduced the subscripts t, e and r to denote parameters specific to the transmitter, eavesdropper and receiver respectively. If the eavesdropper sends on a pulse containing $\bar{n}_e$ photons every time an incoming pulse is detected, then the receiver's count rate will be $$R_r = R_e(1-e^{-\bar{n}_e \eta_r T_r}) = R_t(1-e^{-\bar{n}_m \eta_e T_e})(1-e^{-\bar{n}_e \eta_r T_r}) \quad (10)$$

For $\bar{n}_t = \bar{n}_e \ll 1$, this leads to a dramatic reduction in count rate at the receiver, e.g. for $\eta_e = \eta_r = T_e = T_r = 1$, $$R_r \approx \bar{n}^2 R_2 \quad (11)$$

Evidently such large reductions in count rate, e.g. 90% for $\bar{n}=0.1$, would alarm the receiver. Consequently, the eavesdropper is forced into a strategy where the receiver's count rate is kept constant (at least to within the power fluctuations of the source, as discussed above) by increasing the value of $\bar{n}_e$ for the retransmitted pulses above the value $\bar{n}_t$ for the incoming pulses. Hence, by equating (4) and (10) and using the fact that $\bar{n}_t$ is small, we find that $$\bar{n}_e = \frac{1}{\eta_r T_r} \ln\left[\frac{\eta_e T_e}{\eta_e T_e - \dot{\eta}_r T_r}\right] \quad (12)$$

Figure 2:
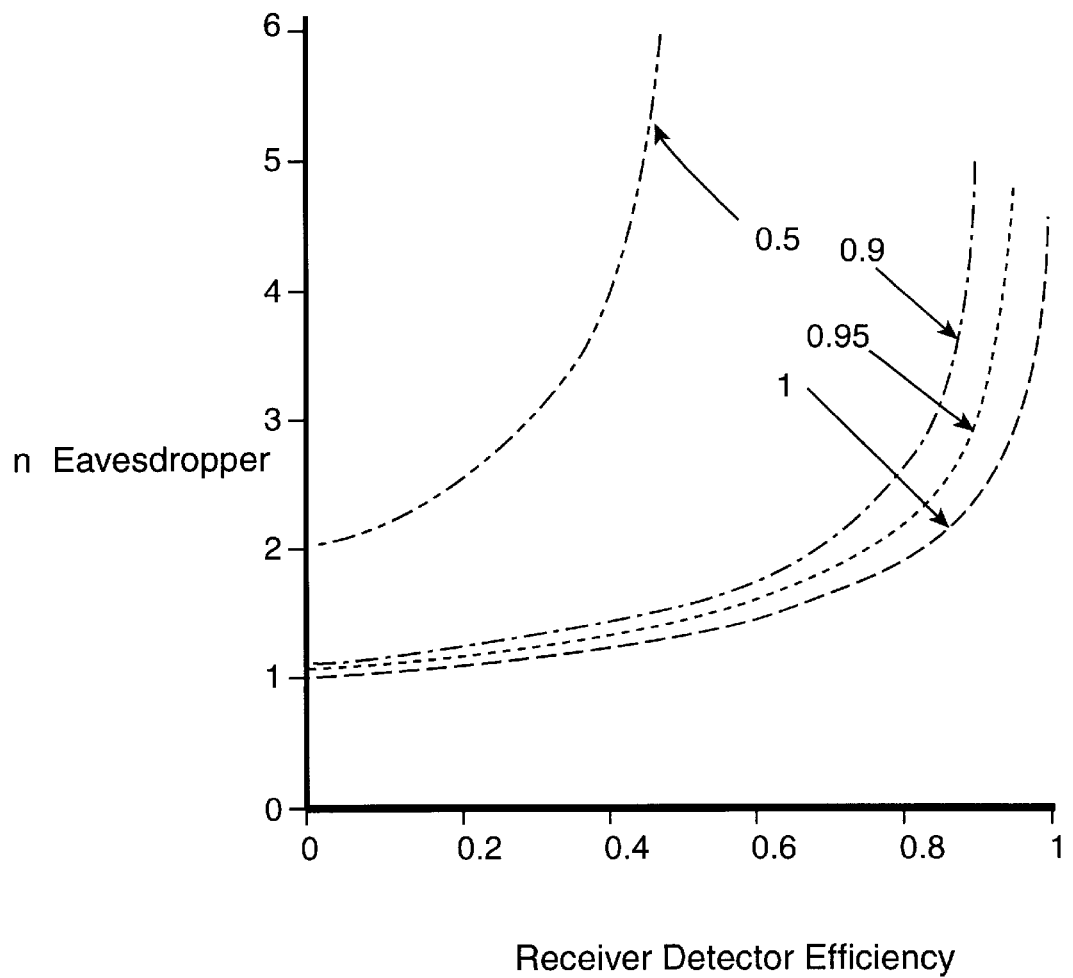
FIG. 2 is a plot of the eavesdropper transmission intensity n as a function of receiver detector efficiency.

For a perfect system in which $\eta_e = \eta_r = T_e = T_r = 1$, $\bar{n}_e$ must tend to infinity if the eavesdropper wishes to guarantee that each pulse sent on to the receiver is definitely detected. However, equation 12 shows that for more practical values of detector efficiency (<80%) the eavesdropper needs in general to increase $\bar{n}_e$ to at least 1. This is illustrated by the curves in FIG. 2 which show the variation of $\bar{n}_e$ with the receiver's detector efficiency for four discrete values of the eavesdropper's detector efficiency. We note also that the increase in $\bar{n}_e$ is independent of the value of $\bar{n}_t$ for the incoming pulses from the transmitter.

Figure 3:
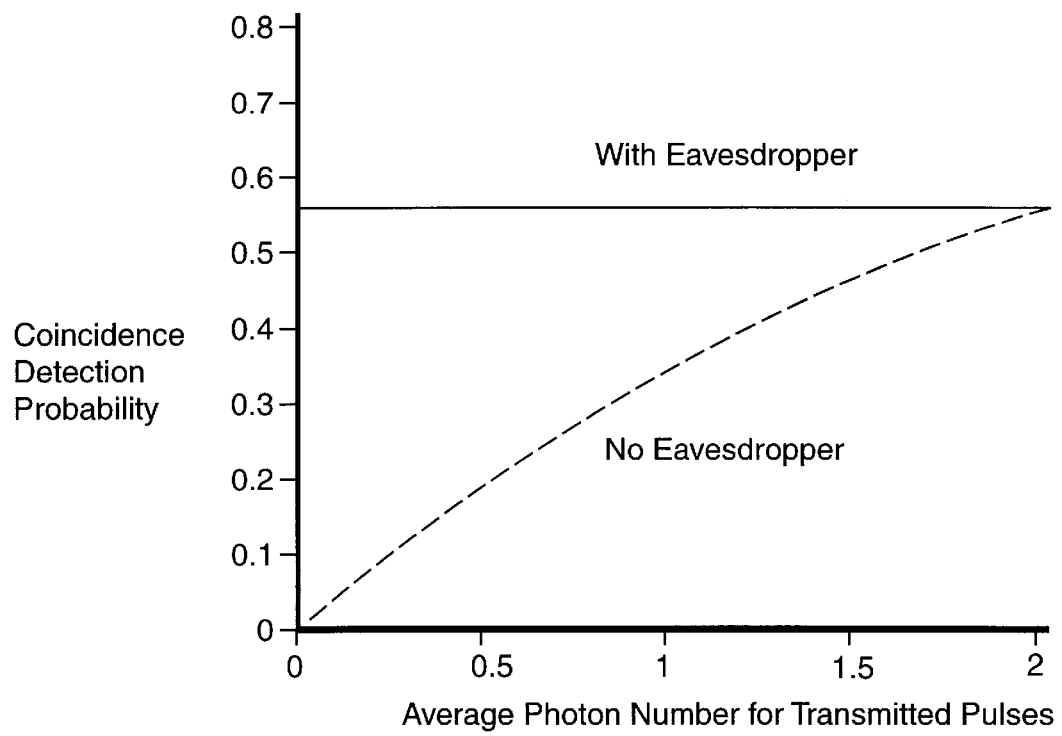
FIG. 3 shows coincidence detection probabilities with and without an eavesdropper.

We have already seen that as the average photon number of an attenuated coherent pulse increases it becomes easier to split into two. Consequently, if the receiver performs a beam-splitter measurement of the type discussed above, the rate of coincidence detections will be greatly increased in the presence of an eavesdropper. FIG. 3 shows the normalised coincidence probability defined by equation 8 plotted as a function of $\bar{n}_t$ with and without the eavesdropper present. In this case the channel was assumed to be loss-less and the detector efficiencies for the receiver and eavesdropper were taken to be 0.8 and 1.0 respectively. It can be seen that the increase in coincidence probability becomes more and more marked as $\bar{n}_t$ decreases. The technique is therefore attractive for enhancing the probability of eavesdropper detection. However, coincidence measurements using a 50:50 coupler or beam splitter would have to be carried out separately from measurements normally performed during the course of quantum key distribution. This would both complicate the design of the receiver and also waste potential key bits. Instead, we propose using the data that would normally be discarded in the Bennett/Brassard four-state cryptography scheme. For example, in the case of the experimental scheme illustrated in FIG. 1, random key sequences are transmitted over the channel by encoding the polarisation of the attenuated optical pulses using modulators in the transmitter T and receiver R. T uses two different representations for the binary digits (0,1), namely (0°, 90°) and (-45°, +45°), and randomly switches between them during key transmission. R also switches randomly and independently between measurement polariser angles of 0° and -45°. After the transmission, R uses a public channel to tell T in which bit-periods a photon was received and which polariser measurement angle was used, but not the result i.e. whether the photon was detected at the 0 or 1 output ports. T then publicly reveals the bit-periods for which the sent and measured polarisation angles differed by $\Delta\theta=0°$ or 90°, and only this half of the data is retained. For these cases the photons ideally have unit probability of being observed at the correct polariser output port, and consequently, the transmitted and received bit sequences should be the same. If an eavesdropper tries to intercept and resend the key these final shared strings will have a substantial error rate typically around 25% [Bennett et al J. Crypt 1992], which T and R check for by publicly comparing, and then discarding, a random subset of their data. These errors arise from the instances in which the eavesdropper has unknowingly made the wrong type of measurement on the channel such that e.g. $\Delta\theta=\pm 45°$. In such cases the outcome of the measurement is probabilistic and a pulse is equally likely to be registered as 0 or a 1. This leads the eavesdropper to sometimes send on the wrong bit thus causing an error in the cases where T and R expect perfect agreement. Returning now to the coincidence detection scheme, we note that polarisation measurements with $\Delta\theta=\pm 45°$ are formally equivalent to measurements with a 50:50 beam splitter. This is because the transmission probability for each output port of the polariser is equal to 50% in this case. Other coding bases give different splitting ratios, e.g. a four-state scheme using (0°,90°) (−22.5°,+67.5°) is equivalent to a 15:85 beamsplitter at the receiver and the probability of coincidences is reduced, although still larger for small $\bar{n}_t$ than in the absence of the eavesdropper. Consequently, R can take the rejected portion of the data and look for coincidence events in which both the 0 and 1 detectors registered a count in the same time-slot. This coincidence rate can then be compared with that expected for the known value of $\bar{n}_t$ with no eavesdropper present. As already shown, if the eavesdropper is present and the received count rate is close to that expected from the known system parameters, then the coincidence rate will be greatly increased especially for small values of $\bar{n}_t$. In summary, the users of the system can enhance their ability to detect eavesdroppers simply by performing additional analysis on data that is collected, but not used, in the standard protocol. The technique exploits properties of the attenuated coherent states used in practical systems and requires no extra components or equipment.

Although the examples above use four-state encoding, other schemes may be used.

Recently, Bennett [Phys. Rev Lett., 68, 3121, (1992)] has developed a quantum cryptography scheme which uses only two non-orthogonal states rather than two bases each containing two orthogonal states as in the example used above. We shall describe the operation of this scheme by reference to a specific example that is simpler and more practical than the version considered by Bennett. Most importantly, we will show how the coincidence detection technique can be used to make this simplified scheme, which would otherwise be vulnerable to an eavesdropper, secure.

We shall take the example of a phase encoded scheme in which the binary digits 0 and 1 are represented by phase shifts of 0° and 90° respectively. Such a scheme could be implemented with a system identical to that shown in FIG. 4. The key distribution proceeds with the transmitter randomly encoding each pulse with one of the two phase shifts, and the receiver randomly choosing one of the two phase shifts for the measurement of each incoming pulse. When the difference in the transmitter and receiver phase shifts $(\phi_t-\phi_r)=0°$ the single-photon interference is fully constructive at one output port which we label C, and fully destructive at the other output port which we label D. So for these cases the photons behave deterministically at the final coupler in the interferometer and will always be detected at C. (Note that the output port at which the photon is detected does not determine the bit as in the four-state scheme, hence the change in labelling scheme from 0 and 1 to C and D). For the other cases in which $(\phi_t-\phi_r)=\pm 90°$ the photons behave probabilistically at the final coupler and are equally likely to be detected at C or D. Consequently, on average ¾ of the receiver's detections will occur at the C port and ¼ will occur at the D port. The former data is discarded whilst the latter 30 is used to generate the key. The receiver uses the public channel to tell the transmitter in which time-slots the D-events occurred. At this point they are in possession of a shared key, since the receiver knows that a photon is only observed at D if $(\phi_t-\phi_r)=\pm 90°$ and can therefore calculate $\phi_t$, and hence the bit, from its knowledge of $\phi_r$.

Of course this is only the case for an ideal noiseless system with no eavesdropper on the transmission channel. In a real system the transmitter and receiver need to check that the error rate is not so high as to indicate continuous eavesdropping on the channel, and then perform error correction and privacy amplification on their shared bit sequences in the normal way [Bennett et al, J. Crypt., 5, 3 (1992)]. As described so far, the current scheme has the advantage of only requiring a simple two-level modulation scheme, however, it is vulnerable to a particular type of intercept/resend attack. Specifically, if the eavesdropper performs measurements on the channel using the same apparatus and phase-shifts as the receiver, then a probabilistic outcome i.e. a detection at the eavesdropper's D port allows the eavesdropper, just like the receiver, to calculate unambiguously which bit was sent by the transmitter. Consequently, if the eavesdropper retransmits only in these (~1 in 4) instances pulses with sufficiently increased average photon number, then the receiver will see neither an increased error rate nor a decreased detection rate. In the original Bennett scheme this type of attack was prevented by the use of a novel reference pulse technique. However, this requires the single photon detector in the receiver to detect a second pulse a short time after the signal photon arrives, and this may be impractical in real systems due to the dead-time (typically ~1 μs) associated with such detectors. Instead, we use the coincidence technique described above to detect this eavesdropping strategy. Now the receiver checks the time-slots in which a D-event was recorded to see if a detection also occurred at the C port. As already discussed, the receiver's measurements are equivalent to beam-splitter measurements in these instances, and the probability of a coincidence event is much larger if the photon number of the pulses has been increased by an eavesdropper. In the four-state scheme the eavesdropper must use $\bar{n}\sim 1$ for the retransmitted pulses in order to maintain the receiver's count rate, but here the eavesdropper must increase $\bar{n}$ to an even larger value (that depends on detector efficiencies) since only 1 in 4 of the detected pulses are sent on to the receiver.

I claim:

1. A method of communication using quantum cryptography including the steps of modulating a single-photon signal from a highly attenuated source, and detecting the modulated signal, characterised in that in the step of detecting the modulated signal the signal is split between two branches according to its encoded state, and signals corresponding to different encoded states are detected independently, and in that the rate of detection of coincident signals in the two branches of the detector is determined and compared with a threshold to detect the presence of an eavesdropper.

2. A method according to claim 1, in which the intensity of the single-photon from the highly attenuated source is such that the average number of photons per time slot is very much less than 1.

3. A method according to claim 1, in which the step of determining the rate of detection of coincident signals and comparing with a threshold is carried out in a control processor (54; FIG. 4) linked to at least one single-photon detector (43,44), after the detection of the signals.

4. A method according to claim 1, in which the single-photons are modulated using a four-state encoding basis, and the step of detecting the rate of detection of coincident signals is carried out for those single-photon signals determined to have been modulated and detected using different respective bases.

5. A method according to claim 1, in which the single-photon signal is modulated using an encryption basis comprising two non-orthogonal states, and the step of detecting the rate of coincidence is carried out in relation to signals determined at the receiver to have been encoded with a known state at the transmitter.

6. A method according to claim 1, in which the single-photon signal is output onto an optical fibre connection linking a transmitter and receiver, a secret quantum cryptographic key being established between the transmitter and receiver using data encoded on the modulated single-photon signal.

7. A method according to claim 1, in which the single-photon signal is output onto a multiple-access network (N; FIG. 5), and each of a plurality of receivers connected to the multiple-access network establishes its own respective quantum cryptographic key.

8. A communication system for use in a method of quantum cryptography comprising a transmitter (T) including a highly-attenuated optical source, one or more receivers (R1–R3) and a network (N) linking the transmitter to the or each receiver, characterised in that the or each receiver includes means for determining the rate of detection of coincident signals in branches of the receiver corresponding to different encoded states and compares the rate of detection with a threshold to detect the presence of an eavesdropper.

9. A system according to claim 8, in which the network is an optical fibre network.

10. A system according to claim 8, in which the network is a multiple access network connected to a plurality of receivers (R1–R3).

* * * * *